United States Patent [19]
Anouchi

[11] 3,811,314
[45] May 21, 1974

[54] TIME-INTERVAL RATE METER FOR TIME MEASURING DEVICES AND METHOD FOR CHECKING TIME PIECES

[76] Inventor: Abraham Y. Anouchi, 83 Oak Hill St., Newton, Mass. 02159

[22] Filed: Sept. 6, 1972

[21] Appl. No.: 286,624

[52] U.S. Cl. .................................................. 73/6
[51] Int. Cl. .......................................... G04b 17/00
[58] Field of Search ....... 73/6; 324/186, 78 D, 79 D

[56] References Cited
UNITED STATES PATENTS

| | | | |
|---|---|---|---|
| 3,370,456 | 2/1968 | Jucker | 73/6 |
| 3,020,749 | 2/1962 | Cropper | 324/186 |
| 3,238,764 | 3/1966 | Greiner | 73/6 |

Primary Examiner—S. Clement Swisher
Attorney, Agent, or Firm—Erwin Salzer

[57] ABSTRACT

A rate meter for checking the accuracy of time measuring devices such as watches and clocks and accurately determining the deviation thereof from a time standard includes a digital readout or display counter indicating in terms of seconds or tenth of seconds per day whether a time measuring device is fast, slow, or exactly on time. The read-out or display counter is controlled by electronic circuitry predicated upon the measurement of time elapsed between two non-consecutive mechanical vibrations, or pulses, of a time measuring device.

9 Claims, 9 Drawing Figures

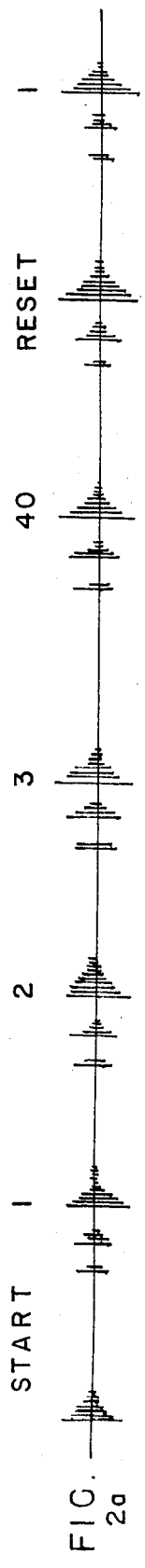
FIG. 2a  START 1  2  3  40  RESET 1
FIG. 2b  COUNT ENABLE GATE
FIG. 2c  TIME REFERENCE
FIG. 2d  GATE OUTPUT = COUNTER INPUT
FIG. 2e
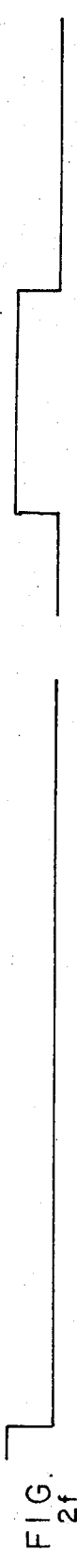
FIG. 2f  STROBE ENABLE
FIG. 2g  STROBE
FIG. 2h  RESET PULSES

TIME-INTERVAL RATE METER FOR TIME MEASURING DEVICES AND METHOD FOR CHECKING TIME PIECES

BACKGROUND OF THE INVENTION

In devices of the kind under consideration, the watch, clock, etc. whose rate is intended to be measured, is placed in a holder including a pick-up transducer. The vibrations of the watch, clock, etc. are detected and converted by the transducer into electric pulses which are fed into an amplifier, and the amplified pulses are used for measuring the rate of the watch, clock, etc. There are two ways for measuring the rate of pulses. One is by counting the number of pulses for a specific length of time, and the other is by measuring the time elapsed between pulses. Devices of this kind are referred to as time-interval rate meters.

The first method is desirable because it can give a count which is directly proportional to the rate. However, where the rate is relatively low, as in the case of the beat of watches, clocks, etc. a very long sampling time is needed for obtaining the desired accuracy. For instance, in the case of a watch whose rate is 5 pulses per second, a sampling duration of 20,000 seconds, which is over 5 and ½ hours, is needed to obtain a desired accuracy of one part in 100,000.

The second method, even though its count is inversely proportional to the rate, was selected for the present rate meter because a high degree of accuracy can be obtained in a very short sampling time. A novel feature embodied in apparatus according to the present invention resides in the fact that the time measured is not that between two consecutive pulses of the watch, clock, etc., but between two non-consecutive pulses as will be shown below more in detail.

Prior art rate meters are generally made up of three units, i.e. a pick-up unit, a time standard unit and a comparison unit. The pick-up unit inlcudes a transducer converting mechanical vibrations into corresponding electric pulses, e.g. a microphone, a preamplifier for amplifying the output of the transducer, a pulse-shaper and divider, and a power amplifier for operating a recording bar. The time standard unit includes a quartz stabilized oscillator or clock, a frequency divider and a power amplifier for operating a synchronous motor of the comparison unit. The last mentioned unit includes a synchronous motor, a recording coil, a recording bar and means for feeding and guiding a roll of recording paper. If a watch, clock, etc. under investigation is on time, the recording bar produces a row of dots on the recording paper which is parallel to the edge thereof. If the watch, clock, etc. under investigation is fast, the row of dots produced by the recording bar is slanted in one direction, and if the watch, clock, etc. is slow, the row of dots produced by the recording bar is slanted in the opposite direction.

The above rate meter is subject to the following limitations and drawbacks.
a. The instrument is electro-mechanical, and has many moving parts which need much servicing.
b. The accuracy of the instrument depends on the tolerances of mechanical parts. To achieve very small tolerances is expensive and makes it difficult to mass produce the meter. With wear and tear of the mechanical parts, the accuracy of the instrument deteriorates gradually.
c. A large amount of recording paper is constantly needed by the user. This is costly, cumbersome and inefficient. Normally a watch repairman does not keep a file of his findings and, therefore, he must add a paper record to his shop.
d. The meter provides the watch rate information in the form of a graph which is not easy to interpret, compared to digital read-out form.
e. The meter is incapable of providing an output information which can be fed to a computer for use in data processing or in research and development.
f. The meter is inherently expensive, and beyond the means of most repair shops.

It is the principal object of the present invention to provide a rate meter for watches, clocks and other time measuring devices which is not subject to the above limitations and drawbacks.

SUMMARY OF THE INVENTION

An electronic rate meter for time measuring devices embodying the present invention includes a transducer for converting mechanical vibrations of a time measuring device into corresponding electric pulses and means for processing said electric pulses including means for amplification thereof. A meter according to the present invention further includes a plurality of cascade connected frequency dividers supplied with electric pulses from said processing means each having a separate output terminal. The meter further includes a gate having a gating input terminal, a clock input terminal and an output terminal. A switching means makes it possible to connect the separate output terminal of each of said plurality of frequency dividers to said gating input terminal of said gate. Reference clock means producing a fixed number of pulses per unit of time are connected to said clock input terminal of said gate. The rate meter further includes a digital readout counter having at least five digits and control means for controlling said digital readout counter by the output appearing on the output terminal of said gate.

BRIEF DESCRIPTION OF THE DRAWINGS

FIGS. 2a to 2h, inclusive, are characteristic traces of the components of the meter according to FIG. 1 when operating as a system.

DESCRIPTION OF PREFERRED EMBODIMENT

Figure 1:
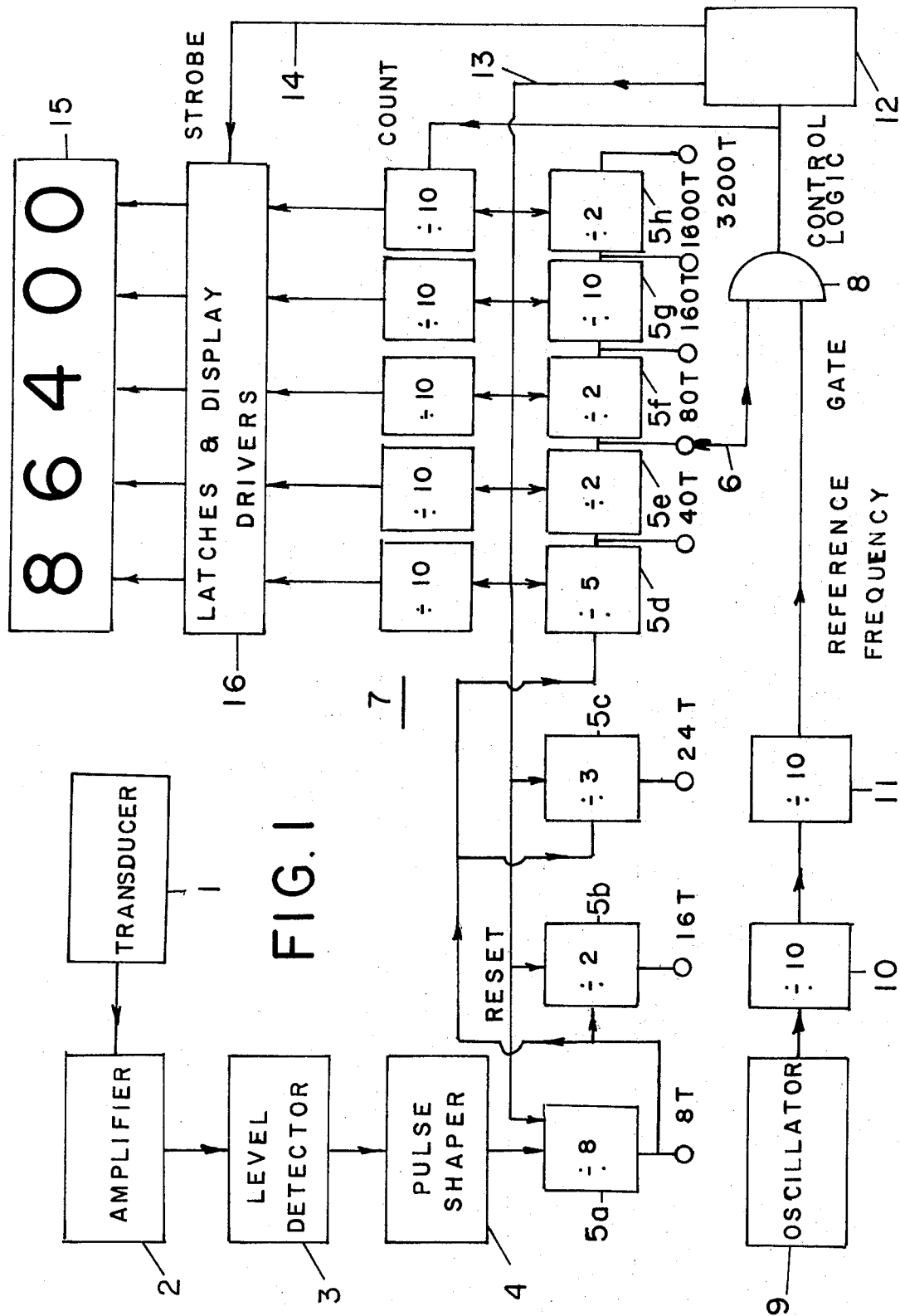
FIG. 1 is a block diagram of a meter embodying the present invention.

Referring now to the drawings, and more particularly to FIG. 1 thereof, reference character 1 indicates a pick-up transducer converting mechanical vibrations of a watch, clock, etc. into corresponding electric signals. These signals are supplied to an automatic gain control amplifier 2. After amplification, the signals are fed to a threshold detector 3 and a pulse shaper 4 whose function is to provide uniformly shaped pulses whose frequency is the same as the beat rate of the watch being measured. This rate may be between 1 and 50 pulses per second, as far as conventional watches are concerned, and between 200 and 700 pulses per second for tuning fork type watches. The pulses are fed to a chain or cascade of frequency dividers 5a . . . 5h which generate the gating duration pulses needed by the counter. The watch pulse rate is divided by 8, by 16, by 24, by 40, by 80, by 160, by 1,600 and by 3,200 respectively.

Other numbers, or divisors, could be selected if needed, but the above numbers or divisors are selected in view of now existing watch standards, as will be more apparent from what follows. The outputs of the frequency dividers 5a . . . 5h are pulses whose duration is equal to 8,16,24,40,80,160,1,600 and 3,200 times that of the beats of various watches. Reference numeral 6 has been applied to indicate a selector switch adapted to be operated from the front panel (not shown) of the rate meter. Switch 6 enables the operator to select the desired duration. The pulses provided by the frequency dividers are used to gate a regular decade counter 7 with either 5 or 6 decades. To this end the output of any of the 8 frequency dividers 5a . . . 5h is supplied to gate 8. A very stable and accurate quartz-crystal-controlled oscillator 9 is used as a time reference. The frequency of oscillator 9 is reduced by two frequency dividers 10,11 and the resulting reference frequency is supplied to gate 8. The output pulses of gate 8 are counted by the decade counter 7 for the duration that gate 8 is opened by frequency dividers 5a . . . 5h. The exact frequency of the crystal oscillator can be selected according to the specific needs of the application for which the instrument is designed as will be explained below more in detail. The output of gate 8 is supplied to a conventional logic module 12 which supplies reset line 13 and strobe line 14 with the required pulses. Reference numeral 15 has been applied to indicate a number of display and numeral 16 has been applied to indicate the latches and display drivers for number display 15.

If it is desired to calibrate display 15 directly in terms of seconds per day for the most common watch rate of 18,000 beats per hour, or 5 beats per second, it is only necessary to select a reference frequency of 10,800 cycles per second. Setting the selector switch 6 on the divide-by-40 position, will select a gating pulse whose duration is that of 40 watch beats, namely 8.64 seconds. The counter 7 will count the 10,800 cycles per second for 8.64 seconds, will stop, and the number 86,400 will be displayed by number display 15. This number will be held on display 15 for the next 8.64 seconds while the counter 7 counts the oscillator pulses during the next 8.64 seconds, after which the new count will be displayed at 15. Any deviation from this number is a measure of the error of the watch under investigation in terms of seconds per day.

Another very common watch mechanism has a beat frequency of 36,000 beats per hour, or 10 beats per second. In this case, the selector switch 6 is set to the divide-by-80 position. The gating pulse now has a duration equivalent to 80 watch beats, but it is again equal to 8.64 seconds, and the displayed number will 86,400 seconds per day, still assuming that the reference frequency is 10,800 cycles per second.

The reference frequency supplied by units 9,10,11 is preferably in the order of 10,800 cycles per second, but does not need to be precisely 10,800 cycles per second, as will be readily apparent from the following.

Assuming the reference frequency to be 10,000 cycles per second, then the number which will be displayed at 15 is the elapsed time between the selected number of watch pulses. For instance, a divide-by-40 gate signal, when used with a watch rate of 18,000 beats per hour, or 5 beats per second, will have a duration of 8 seconds if the watch is exactly on time. It will gate the counter to count 80,000 oscillator pulses, after which the number 80,000 will be displayed at 15. This number is directly a measure of time and it is so close to 86,400 that it can also be used to indicate the rate in seconds per day, and any deviation therefrom.

It is possible to select other reference frequencies for different watch mechanisms so that the display will always be calibrated to read 86,400 seconds per day when the watch rate is on time.

The watch industry uses various beat frequencies for watches. However the great majority of watches are limited to a few very common rates. In converntional watches the main frequencies are 3,600, 16,000, 17,280, 18,000, 19,200, 19,800, 36,000 and 72,000 beats per hour. In the case of tuning fork type watches of which that known by the trademark Accutron is the most popular, the frequency is 360 cycles per second, although 200 and 300 cycles per second are also used.

In the case of escapement type movements, the ticking of a watch, as sensed by the human ear, is in fact a complex sound effect produced by the motion of the mechanical parts thereof, in particular its escapement. Every escapement produces periodic sequences or bursts of sounds followed by a pause. The units 2,3,4 of FIG. 1 convert these periodic irregular bursts into precise electric pulses. Because of the great accuracy of the measuring system of FIG. 1 and because of irregularities in any watch movement, the indications appearing at display 15 are not absolutely constant but may change from time to time for the very same watch. The term unharmonicity is applied in reference to the deviation from strictly harmonic motion which can never be fully achieved.

Referring now to FIGS. 2a to 2h, the traces shown therein have been drawn for the case in which the counter 7 samples 40 ticks of a time piece having 18,000 beats per hour, is then reset and then begins another count.

FIG. 2a shows diagrammatically the electric analog signal supplied from transducer 1 to amplifier 2 and supplied in amplified form by amplifier 2 to the threshold limiter or level detector 3.

FIG. 2b shows the signal supplied from the pulse shaper 4 to the divider cascade 5a to 5h.

FIG. 2c shows the signal supplied from one of the taps of cascade 5a to 5h to gate 8. It is apparent from FIG. 2c that the enable gate pulses are of much larger duration than the output pulses of pulse shaper 4.

FIG. 2d indicates diagrammatically the pulses generated by crystal controlled oscillator or clock 9 as supplied to one of the input terminals of AND-gate 8.

FIG. 2e shows the output of gate 8 plotted against time.

FIG. 2f shows the strobe enable pulses produced by the control logic unit 12, FIG. 2g shows the strobe pulses transmitted through line 14 to unit 16 and FIG. 2h shows the reset pulses transmitted from unit 12 through line 13 to units 5a to 5h and 7.

The circuitry of FIG. 1 includes, of course, a power supply which has been deleted in the interest of clarity and simplicity of representation. The circuitry of FIG. 1 may further include a flickering light, or other analog signal which can be sensed by a human observer, indicating that the regular beat ticking sound made by each time piece is present.

Before the rate meter is applied one must determine the normal rate of beats per hour, or the ticks per second, which the particular time piece under investigation is supposed to have. This information is generally supplied by the manufacturer. Then the selector switch 6 must be adjusted. The selector switch 6 is preferably formed by a set of push buttons or keys. For watches with regular movements a table such as that below may be used to properly position the selector switch 6.

REGULAR MOVEMENT

| Beats per hour | Ticks per second | Ticks per Reading | Display Reading |
|---|---|---|---|
| 3,600 | 1.000 | 8 | 80,000 |
| 7,200 | 2.000 | 16 | 80,000 |
| 8,000 | 2.222 | 16 | 72,000 |
| 8,800 | 2.444 | 16 | 65,454 |
| 9,000 | 2.500 | 16 | 64,000 |
| 9,600 | 2.667 | 16 | 60,000 |
| 10,800 | 3.000 | 24 | 80,000 |
| 12,000 | 3.333 | 24 | 72,000 |
| 14,400 | 4.000 | 24 | 60,000 |
| 16,000 | 4.444 | 40 | 89,111 |
| 17,280 | 4.800 | 40 | 83,333 |
| 18,000 | 5.000 | 40 | 80,000 |
| 19,200 | 5.333 | 40 | 75,000 |
| 19,800 | 5.500 | 40 | 72,727 |
| 21,000 | 5.833 | 40 | 68,640 |
| 21,600 | 6.000 | 40 | 66,667 |
| 24,000 | 6.667 | 40 | 60,000 |
| 28,800 | 8.000 | 40 | 50,000 |
| 36,000 | 10.000 | 80 | 80,000 |
| 48,000 | 13.333 | 80 | 60,000 |
| 54,000 | 15.000 | 80 | 53,333 |
| 72,000 | 20.000 | 160 | 80,000 |
| 96,000 | 26.667 | 160 | 60,000 |
| 108,000 | 30.000 | 160 | 53,333 |
| 180,000 | 50.000 | 160 | 32,000 |
| 360,000 | 100.000 | 160 | 16,000 |

For watches having a tuning fork movement a table such as that below may be used to properly position the selector switch 6.

TUNING FORK MOVEMENT

| Frequency in Vibrations per Second | Vibrations per Reading | Display Reading |
|---|---|---|
| 200 | 1,600 | 80,000 |
| 240 | 1,600 | 66,667 |
| 300 | 1,600 | 53,333 |
| 360 | 3,200 | 88,888 |
| 400 | 3,200 | 80,000 |
| 480 | 3,200 | 66,667 |
| 720 | 3,200 | 44,444 |

Assuming the time piece under investigation has a normal rate of 18,000 beats per hour, or 5.0 ticks per second, The table above indicates that on investigating this particular time piece each reading on display 15 results from 40 ticks. Consequently the movable part of selector switch 6 is caused to engage tap 40 T of frequency divider 5a to 5h. The rate meter will count the duration of 40 ticks and display the amount of time needed for the count. If the time piece under investigation has the normal rate of beats or ticks indicated above, the rate meter will display the number 80,000, assuming the reference frequency to be 10,000. If the number displayed exceeds 80,000, e.g. is 80,060, the time piece is slow, and in the particular instance slow by 60 seconds a day. On the other hand, if the number displayed is less than 80,000, e.g. 79,960, the time piece is fast, and in the particular instance fast by 60 seconds a day.

The rate meter will up-date the readout in regular intervals of time involving many beats or ticks of the time piece under investigation. As a result, differences of the times between consecutive beats or ticks are averaged out. These differences are due - as mentioned above - to inaccuracies in the mechanism of any mechanical time piece.

If a tuning fork time piece is under investigation, e.g. a watch known by the trademark and type designation Accutron 218 having as many as 360 ticks per second, as is apparent from the table above, the movable contact of selector switch 6 is caused to engage tap 3200 T of the frequency divider 5a to 5h. If the watch is exactly on time the number appearing on the readout display 15 will be 88,888, as indicated in the table above relating to tuning fork type time pieces. If the number appearing on readout display 15 is a smaller number, the watch is fast, e.g. if the number appearing on the readout display is 88,884, the watch is fast by 4 seconds per day. On the other hand, if the number appearing on the readout display 15 is larger than 88,888 the watch under test is slow, e.g. if the number reads 88,892 the watch is slow by 4 seconds a day.

It will be understood that counter 7 is a conventional decadic counter, sometimes also referred-to as a decimal counter.

For precision watches requiring vertification of smaller deviations than 1 sec. per day, substantially the same circuitry as shown in FIG. 1 may be used wherein display 15 and its associated parts are designed to indicate six digit numbers rather than five digit numbers and wherein the frequency of the time standard is 10 times larger, i.e. 108,000 cycles per second or 100,000 cycles per second, respectively. Then the last digit display 15 will relate to tenth of a second rather than to seconds.

While the numerical examples which have been given above are based on preferred numbers, the invention is not limited to these numbers, as will readily be apparent from the following:

Let $t$ . . . be the time elapsed between sampled pulses;

$F$ . . . be the frequency of the clock;
$N$ . . . be the displayed number;
$p$ . . . be the number of pulses per second, and
$n$ . . . be the number of pulses sampled.
Then $t = n/p$     (1)

and $N = F \cdot t$     (2)

If
$F = 10,800;$
$p = 5,$ and
$n = 40.$
Then
$t = 40/5 = 8$ and
$N = 10,800 \cdot 8 = 86,400.$
Assuming
$F = 10,000$
$p = 10$
$n = 80.$
Then
$t = 80/10 = 8$ and
$N = 10,000 \cdot 8 = 80,000.$
Assuming
$F = 108,000$
$p = 10$
$n = 80.$ Then
$t = 80/10 = 8$ and
$N = 108,000 \cdot 8 = 864,000$ If $N=864,000$ a decimal point may be arranged before the last digit displaced, thus yielding 86,400.0. This is a readout calibrated in seconds per day (24 hours) to an accuracy of one tenth of a second per day.

The transducer or sensor 1 referred-to above may take different forms depending upon the nature of the watch movement under investigation. If an escapement type watch movement is to be investigated the transducer or sensor 1 may take the form of a microphone. For investigating tuning fork movements a transducer in form of a pickup coil may be used converting magnetic fields into analogous electric currents. In other instances a piezoelectric crystal transducer may be preferable.

The above data refer to time pieces having up to 360,000 ticks or vibrations per hour. So-called quartz watches may have much higher frequencies as, for instance, 720,000 or 1,296,000 beats per hour.

For instance the family of quartz watches known by the trademark TIMEX have a frequency of 49,152 Hertz which is divided down to drive a balance wheel at a standard beat frequency of 21,600 beats per hour. The claimed accuracy of most quartz watches is 0.2 seconds per day. Hence such watches call for the six digit type meter disclosed above rather than for the five digit variety. Another so-called quartz watch is the watch known by the trademark Bulova Accuquartz having a quartz frequency of 32,768 Hertz. Investigation of this particular make calls likewise for a six digit meter as described above.

The circuitry disclosed above is a preferred embodiment of the invention. and it is apparent that this circuitry may be changed to meet new requirements without departing from the spirit and scope of the invention.

An important aspect of the invention is to arrive at a numerical display in terms of seconds per day. This end is reached by the following process steps.

a. The rhythm of a time piece is sensed and said rhythm is converted into analogous electric pulses.

b. Time-standard electric pulses having a constant frequency are generated.

c. A predetermined number of said analogous pulses is sampled. Said time standard pulses are gated by said predetermined number of analogous pulses and the gated time-standard pulses are counted and numerically displayed. In so doing the aforementioned predetermined number of sampled analogous pulses is selected in such a way that the numerically displayed number is substantially equal to the number of seconds in a day, irrespective of the frequency of said analogous electric pulses.

It is thus possible to arrive at numerical displays in the order of 86,400 also with so-called quartz watches whose frequency is higher than that of other watches.

To arrive at a universally applicable rate meter calls for a cascade 5a to 5h having a relatively large number of properly spaced units. The cascade shown in FIG. 1 has a smallest divisor of 8 and a largest divisor of 3,200 and thus it may be said that this cascade has a band width of several hundred, the term band width being applied in this context to designate the ratio of the largest divisor 3,200 to the smallest divisor 8.

I claim as my invention:

1. An electronic time-interval rate meter for time measuring devices including
   a. transducer means for converting the rhythm of a time measuring device into corresponding electric currents;
   b. means for processing said currents including means for amplification thereof;
   c. a reference clock means producing a fixed number of pulses per unit of time;
   d. an AND-gate having one input terminal connected to said reference clock means and another input terminal supplied with an input derived from said processing and amplifying means;
   e. a digital readout counter having at least five digits for numerically displaying the output of said AND-gate; and
   f. a plurality of cascade connected frequency dividers including switching means interposed between said processing and amplifying means and said AND-gate for selectively varying the periods of time during which said AND-gate is open.

2. An electronic rate meter as specific in claim 1 wherein said plurality of cascade connected frequency dividers is adapted to establish a band of divisors having a band width of several hundred.

3. An electronic rate meter as specified in claim 2 wherein said reference clock means has a frequency of about 10,000 pulses per second and wherein said band of dividers includes the numbers 8,16,24,40,80,160,1,600 and 3,200.

4. An electronic rate meter as specified in claim 1 wherein said digital readout counter is a five digit instrument, wherein said reference clock means has a frequency of about 10,000 pulses per second and wherein the smallest divisor of said plurality of cascade-connected frequency dividers is selected so that when said current processing means delivers to said AND-gate gating pulses at the rate of about 3,600 per hour, said readout counter indicates about 80,000.

5. An electronic rate meter as specified in claim 1 wherein said digital readout counter is a six digit instrument and wherein said reference clock means and said plurality of cascade connected frequency dividers are calibrated in such a fashion that the last digit of said digital readout counter indicates ± tenth of a second for a plurality of standard beat frequencies.

6. An electronic time-interval rate meter for time measuring devices which produce trains of mechanical pulse including in combination
   a. transducer means for converting the rythm of a time measuring device into corresponding electric currents;
   b. processing means for said currents including means for the amplification thereof;
   c. a plurality of cascade connected frequency dividers adapted to establish a band of divisors having a band width of several hundred supplied with electric currents from said processing means and having separate output terminals;
   d. a gate having a gating input terminal, a clock input terminal and an output terminal;
   e. switching means for selectively connecting each of said separate output terminals of each of said plurality of frequency dividers to said gating input terminal of said gate;

f. reference clock means producing a fixed number of pulses per unit of time connected to said clock input terminal of said gate;

g. a digital counter having at least five digits for counting the output of said output terminal of said gate; and h. a numerical display and control circuitry therefor for periodically updating the numbers displayed by said numerical display in accordance with changes of the counts of said counter.

7. A rate meter as specified in claim 6 wherein said plurality of cascade connected frequency dividers and said reference clock are calibrated to allow display of a number close to 80,000 for time measuring devices which are exactly on time and having beat rates per hour of about 3,600, 10,800, 16,000, 36,000, 720,000 and 1,296,000.

8. A rate meter as specified in claim 6 wherein said digital counter has six digits of which the last digit displays approximately tenth of a second.

9. A rate meter as specified in claim 6 wherein said plurality of cascade connected frequency dividers is adapted to divide the number of electric pulses supplied to them by the numbers 8, 16, 24, 40, 80, 160, 1,600 and 3,200, and wherein said reference clock means produces about 10,000 pulses per second.

* * * * *